US012331758B1

(12) United States Patent
Pohler

(10) Patent No.: US 12,331,758 B1
(45) Date of Patent: Jun. 17, 2025

(54) GRINDER PUMP AND CUTTING ASSEMBLIES THEREOF

(71) Applicant: Liberty Pumps, Inc., Bergen, NY (US)

(72) Inventor: Donald M. Pohler, North Chili, NY (US)

(73) Assignee: Liberty Pumps, Inc., Bergen, NY (US)

( * ) Notice: Subject to any disclaimer, the term of this patent is extended or adjusted under 35 U.S.C. 154(b) by 0 days.

(21) Appl. No.: 18/635,953

(22) Filed: Apr. 15, 2024

Related U.S. Application Data

(60) Provisional application No. 63/557,055, filed on Feb. 23, 2024.

(51) Int. Cl.

*F04D 7/04* (2006.01)
*B02C 18/00* (2006.01)
*F04D 29/22* (2006.01)

(52) U.S. Cl.

CPC .......... *F04D 7/045* (2013.01); *B02C 18/0092* (2013.01); *F04D 29/2288* (2013.01)

(58) Field of Classification Search

CPC .. F04D 29/2288; F04D 7/045; B02C 18/0092
See application file for complete search history.

(56) References Cited

U.S. PATENT DOCUMENTS

| | | | | |
|---|---|---|---|---|
| 4,842,479 | A * | 6/1989 | Dorsch | F04D 7/045 415/206 |
| 7,159,806 | B1 * | 1/2007 | Ritsema | F04D 3/02 241/89.4 |
| 9,719,515 | B2 * | 8/2017 | Pohler | F04D 1/00 |
| 10,316,846 | B2 * | 6/2019 | Davis | F04D 29/4293 |
| 10,364,821 | B2 | 7/2019 | Pohler | |
| 11,161,121 | B2 * | 11/2021 | Brinkmann | F04D 7/045 |
| 11,253,866 | B2 | 2/2022 | Backe | |
| 11,396,023 | B1 * | 7/2022 | Ciotola | B02C 18/0092 |
| 11,471,893 | B2 * | 10/2022 | Neer | F04D 29/2288 |
| 2022/0145890 | A1 | 5/2022 | Wang | |

* cited by examiner

*Primary Examiner* — Justin D Seabe
(74) *Attorney, Agent, or Firm* — John M. Hammond; Patent Innovations LLC

(57) ABSTRACT

A grinder pump comprising a volute housing and a cutting assembly including a cutter plate comprised of a mounting flange and a cutting disc. The volute housing has a mounting shoulder that is joined to the mounting flange of the cutter plate. The mounting flange includes a mounting surface joined to the mounting shoulder of the volute housing. The mounting flange is comprised of an outer side wall, an inner region, and an inner side wall. The cutting disc is bounded by an inner surface, an outer surface, and a lateral side wall, and includes an outer region contiguous with the inner region of the mounting flange. The inner surface of the cutting disc and the inner side wall of the mounting flange form a cylindrical recess in the cutter plate.

20 Claims, 16 Drawing Sheets

GRINDER PUMP AND CUTTING ASSEMBLIES THEREOF

CROSS-REFERENCE TO RELATED PATENT APPLICATIONS

This application claims the benefit of U.S. Provisional Patent Application No. 63/557,055 filed Feb. 23, 2024, the disclosure of which is incorporated herein by reference. The above benefit claim is being made in an Application Data Sheet submitted herewith in accordance with 37 C.F.R. 1.76 (b) (5) and 37 C.F.R. 1.78.

BACKGROUND

Technical Field

Grinding impeller and cutting assemblies for grinder pumps, for reducing the size of suspended solids in a liquid stream and simultaneously pumping the liquid stream.

Description of Related Art

Grinder pumps are commonly used in liquid transfer applications that require the grinding of large solid or semisolid materials contained in a liquid, in order to grind, cut, or shred such materials. Ultimately, such solid or semisolid materials are reduced in size to the point where a slurry is formed, which is more easily pumped or otherwise transported, and which is more disposable than the solids themselves. Grinder pumps typically have an axial inlet connected to a pumping chamber, and a driven shaft extending through the pumping chamber and into the inlet. The shaft rotates a cutting cylinder in proximity to an annular ring, or a cutting disk in proximity to a cutter plate, thereby providing the cutting action of the pump. Other variations and configurations of grinder pumps are known, which are intended to provide shearing action between shearing parts operating cooperatively at close tolerances.

SUMMARY

The configuration of the cutting disk, annular ring, and/or of the other shearing parts are of high importance in the operation of grinder pumps. The particular shearing parts must be capable of shearing a wide range of entrained solids in a liquid stream that is entering the pump. In commercial and residential sewage pumping applications, such solids include fecal matter, feminine hygiene products, cigarette butts, waste foodstuffs, food wrappers and other food containers, as well as a range of unintentionally entrained solids such as small articles of clothing and small toys. Such solids have a wide variety of properties that are adverse to the operation of the pump, including high shear strength, abrasiveness, hardness, elasticity, and/or plasticity. Materials that are abrasive may gradually wear away the cutting edges of the grinding parts of the pump. Materials that have high shear strength and/or high hardness may shatter or deform the cutting edges of the grinding parts of the pump. In general, the shearing action that occurs in conventional grinder pumps occurs at a limited number of fixed locations on a cutter plate and cutter blade of a grinder pump.

Heretofore, when the configuration of a cutter plate and cutter blade is optimized for maximum effective cutting, the configuration typically limits other aspects of the pump, including the liquid pumping capacity of the pump. In effect, the cutter plate and cutter blade configuration restrict the flow of liquid and entrained solids through the cutter plate and on to the pump impeller, thereby limiting the pump capacity as compared to the capacity if no cutter plate and blade were present. Additionally, due to the throttling effect of the cutter plate and blade, in order to achieve the desired pump output, it may be necessary to increase the size and/or RPM of the pump motor that drives the impeller and cutting assembly. It is preferable to avoid the need to increase pump motor size because of considerations such as motor cost, motor housing volume, heat generation, and motor maintenance requirements.

The Applicant has discovered a cutter plate configuration that enables increased liquid flow, as compared to conventional cutter plates, at a given pump power input and/or pump RPM, while maintaining the desired solid grinding performance of the cutter plate and cutter blade. Additionally, in combination with the cutter plate and blade, the Applicant has discovered an improved impeller configuration that provides the desired pump output while also functioning as a secondary solids grinder.

More particularly, according to the present disclosure, a grinder pump is provided comprising a volute housing and a cutting assembly including a cutter plate comprised of a mounting flange and a cutting disc. The volute housing has a mounting shoulder that is joined to the mounting flange of the cutter plate. The mounting flange includes a mounting surface joined to the mounting shoulder of the volute housing. The mounting flange is comprised of an outer side wall, an inner region, and an inner side wall. The cutting disc is bounded by an inner surface, an outer surface, and a lateral side wall, and includes an outer region contiguous with the inner region of the mounting flange. The inner surface of the cutting disc and the inner side wall of the mounting flange form a cylindrical recess in the cutter plate.

The grinder pump may be further comprised of an impeller contained in the volute housing and includes a central hub joined to a drive shaft driven by the motor, and a plurality of vanes extending radially outwardly from the central hub. The impeller vanes may extend axially to a shearing surface of the flange of the cutter plate. The impeller vanes may be separated from the shearing surface of the flange by a running clearance. In such cases, the impeller vanes may extend axially to within 0.005 to 0.060 inches of the shearing surface of the flange. In some cases, the impeller may have a ratio of impeller diameter to impeller height of 1.6:1 to 11.5:1. In some cases, the impeller may have a ratio of impeller diameter to impeller height of 2.0 to 5.0.

The grinder pump may be further comprised of a rotary cutter joined to the drive shaft and including at least a first cutting blade and a second cutting blade. Each of the first and second cutting blades may define a cutting plane perpendicular to the drive shaft axis of rotation and parallel to the outer surface of the cutting disc. The cutting disc may include a plurality of pairs of radially inwardly located through holes and radially outwardly located through holes extending from the inner surface of the cutting disc to the outer surface of the cutting disc. The radially outwardly located through holes may have diameters greater than the radially inwardly located through holes.

In some cases, a grinder pump of the present disclosure may be provided with a cutter plate that does not include a recess. Instead, the shearing surface and the inner surface of the cutting disc of the cutter plate may be coplanar with each other. In the operation of such a pump, the bottom edges of the impeller vanes move along the inner surface of the cutting disc and the shearing surface 154 of the mounting flange. The impeller vanes may be separated from the shearing surface of the cutter plate and the inner surface of the cutting disc by a running clearance.

Each of the foregoing implementations and apparatus can be employed individually or in conjunction.

BRIEF DESCRIPTION OF THE DRAWINGS

The present disclosure will be provided with reference to the following drawings, in which like numerals refer to like elements, and in which.

Figure 1:
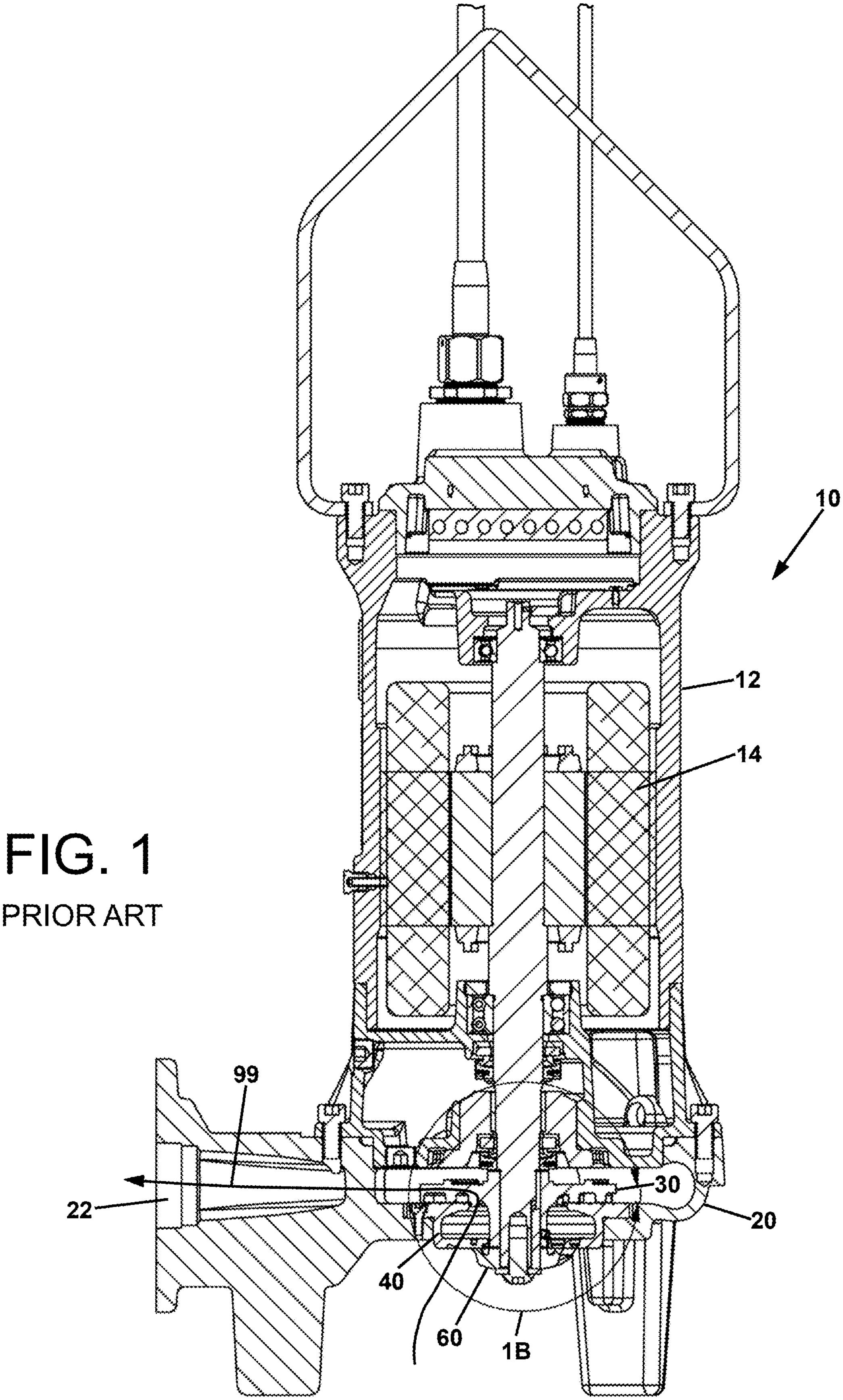
FIG. 1 PRIOR ART
FIG. 1A is a cross-sectional view of a conventional grinder pump.
FIG. 1B is a detailed cross-sectional view of the impeller and cutting assembly of the grinder pump of FIG. 1A.
FIGS. 1C, 1D, and 1E are bottom, perspective, and side cross-sectional views of a cutter plate of the pump of FIG. 1A.
FIGS. 1F, 1G, and 1H are bottom, perspective, and side cross-sectional views of an impeller of the pump of FIG. 1A.
FIG. 1I is an axial upward cross section of the pump of FIG. 1A taken along line 1I-1I of FIG. 1B.
Figure 1B:
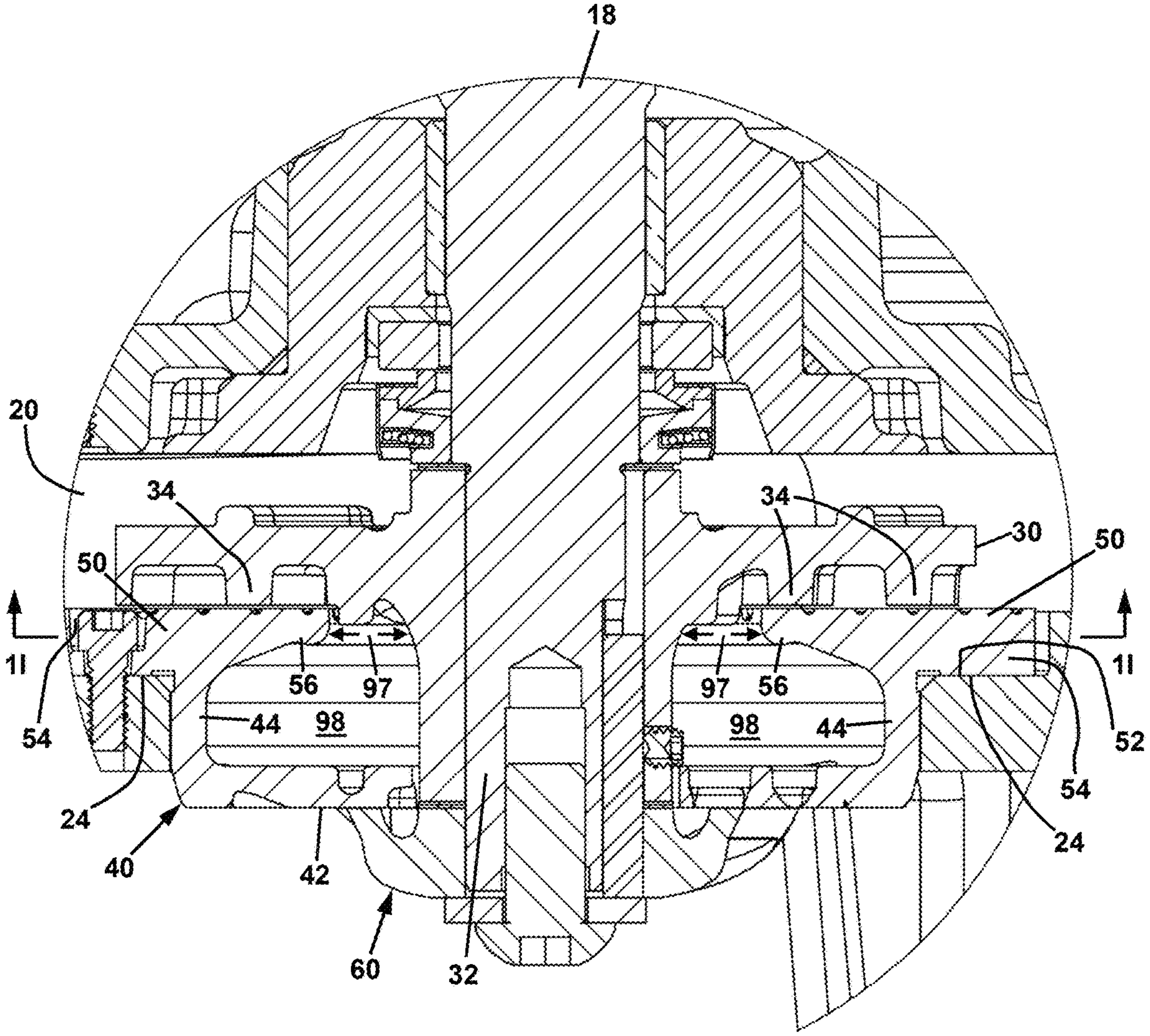
PRIOR ART FIG. 1B
Figure 1C:
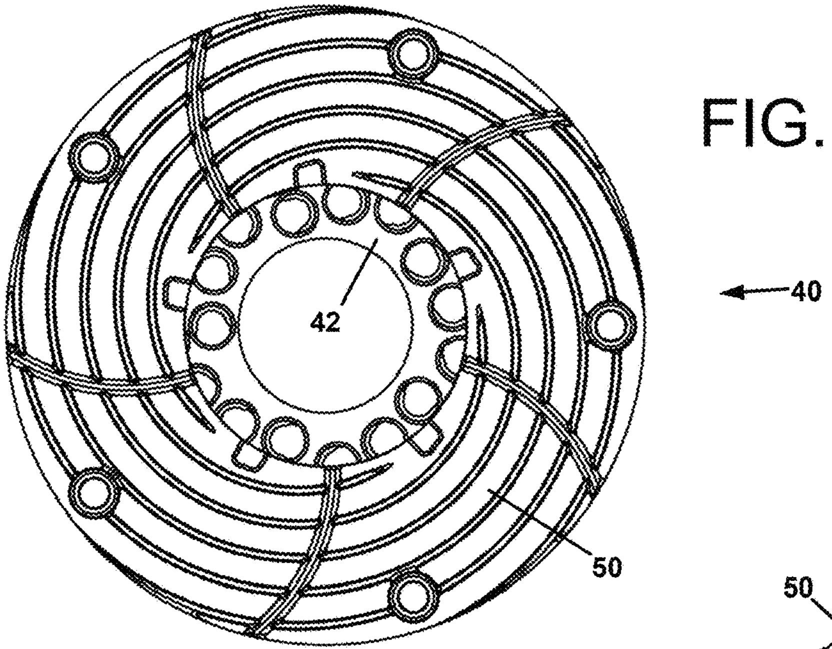
FIG. 1C PRIOR ART
Figure 1D:
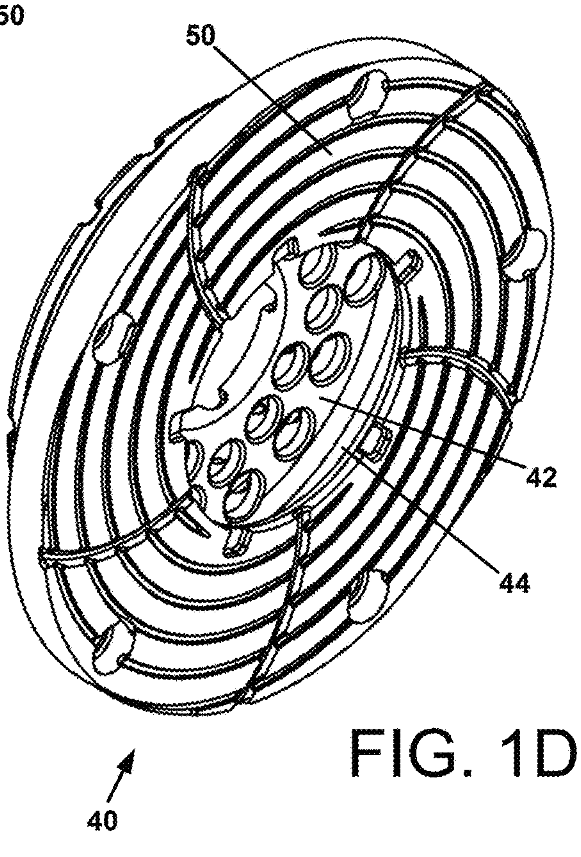
Figure 1E:
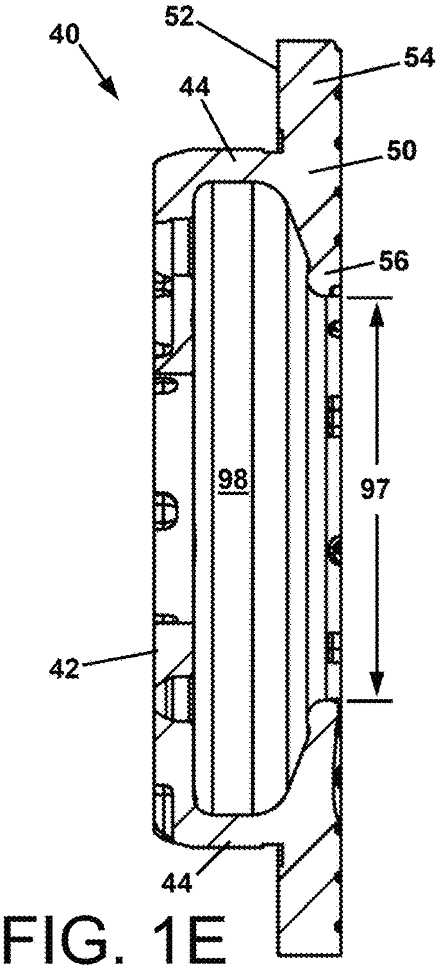

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present disclosure, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may vary.

In the following disclosure, a cutting assembly is described in the context of its use in a grinder pump. However, it is not to be construed as being limited only to use in grinder pumps. The cutting assembly of the present disclosure is adaptable to any use in which reducing the size of suspended solids in a liquid stream is desirable to be provided. Additionally, this disclosure may identity certain components with the adjectives "top," "upper," "bottom," "lower," "left," "right," etc. These adjectives are provided in the context of use of the cutting assembly in a grinder pump, and in the context of the orientation of the drawings, which is arbitrary. The description is not to be construed as limiting the cutting assembly and/or the pump to use in a particular spatial orientation. The instant cutting assembly and pump may be used in orientations other than those shown and described herein.

It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The terms "about" and "substantially" are used herein with respect to measurable values and ranges due to expected variations known to those skilled in the art (e.g., limitations and variabilities in measurements).

FIGS. 1A-1I depict a conventional grinder pump, a detailed side cross section showing a cutter assembly and impeller of the pump, detailed individual drawings of the pump cutter plate, cutter, and impeller, and an axial upward cross section of the pump. Referring to FIGS. 1A-1I, the grinder pump 10 is comprised of a motor housing 12 containing a motor 14, and a volute housing 20 joined to the motor housing 12 and containing an impeller 30, a cutter plate 40 and a cutter 60. The cutter 60 and impeller 30 are joined to a rotary shaft 18 that is driven by the motor. The rotating cutter 60 provides a shearing action with the stationary cutter plate 40 to grind solids entrained in a liquid stream into small particles. The rotating impeller 30 draws a slurry of the liquid and small particles through holes in the cutter plate, and discharges the slurry out through a discharge port 22 in the volute housing, as indicated by arrow 99.

Referring in particular to FIGS. 1B-1E, the cutter plate 40 is comprised of a cutting disc 42, which is joined to a side wall 44, which is joined to a mounting flange 50. The mounting flange 50 includes a mounting surface 52 that is joined to a mounting shoulder 24 of the volute housing 20. An outer portion 54 of the mounting flange 50 extends radially outwardly beyond the side wall 44 of the cutter plate 40. An inner portion 56 of the mounting flange 50 extends radially inwardly from the side wall 44 of the cutter plate 40. The cutting disc 42, hub 32 of the impeller 30, side wall 44, and inner portion 56 of the mounting flange 50 form an annular cavity 98 between the cutting disc 42 and the impeller 30.

In the conventional grinder pump 10, the cutter plate 40 is provided with the mounting flange 50 having the inner portion 56 that extends radially inwardly from the side wall 44 of the cutter plate 40. Additionally, the height of the impeller vanes 34 is relatively low compared to the diameter of the impeller 30. In the impeller 30 depicted in FIGS. 1F-1H, the ratio of the impeller diameter to impeller vane height is about 30:1.

Figure 2A:
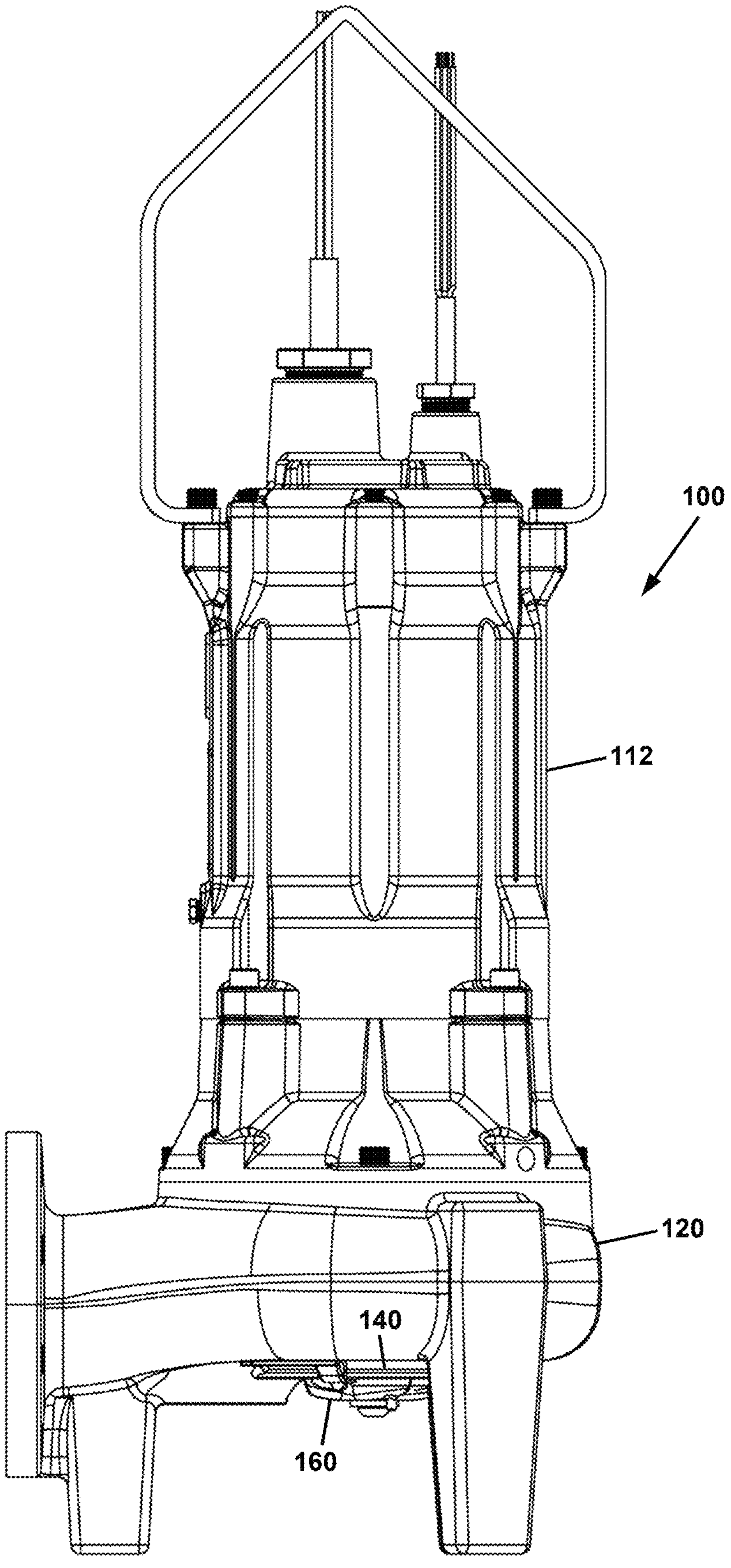
FIG. 2A is a side elevation view of a grinder pump of the present disclosure.
Figure 2B:
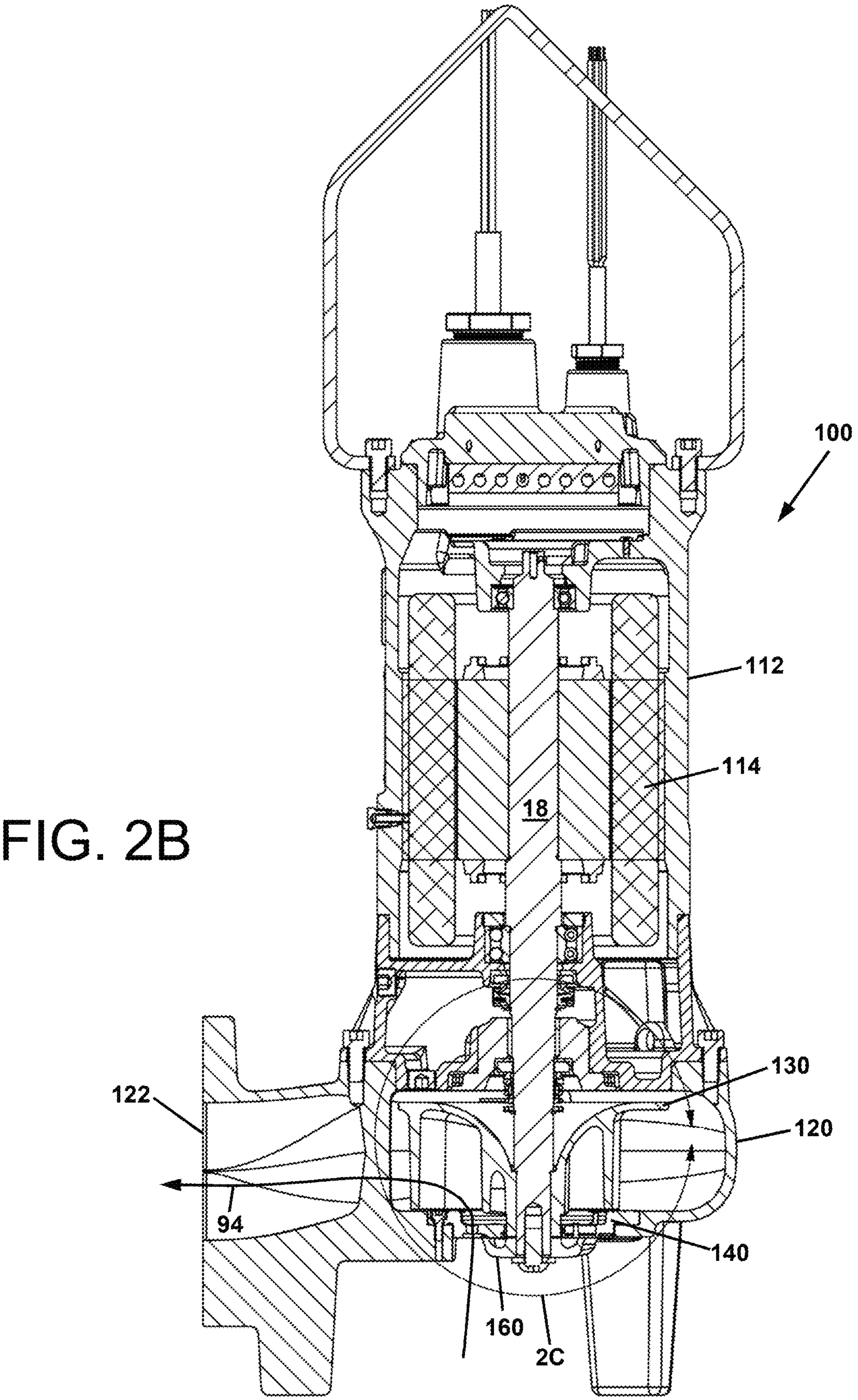
FIG. 2B is a side cross-sectional view of a grinder pump of the present disclosure.
Figure 2C:
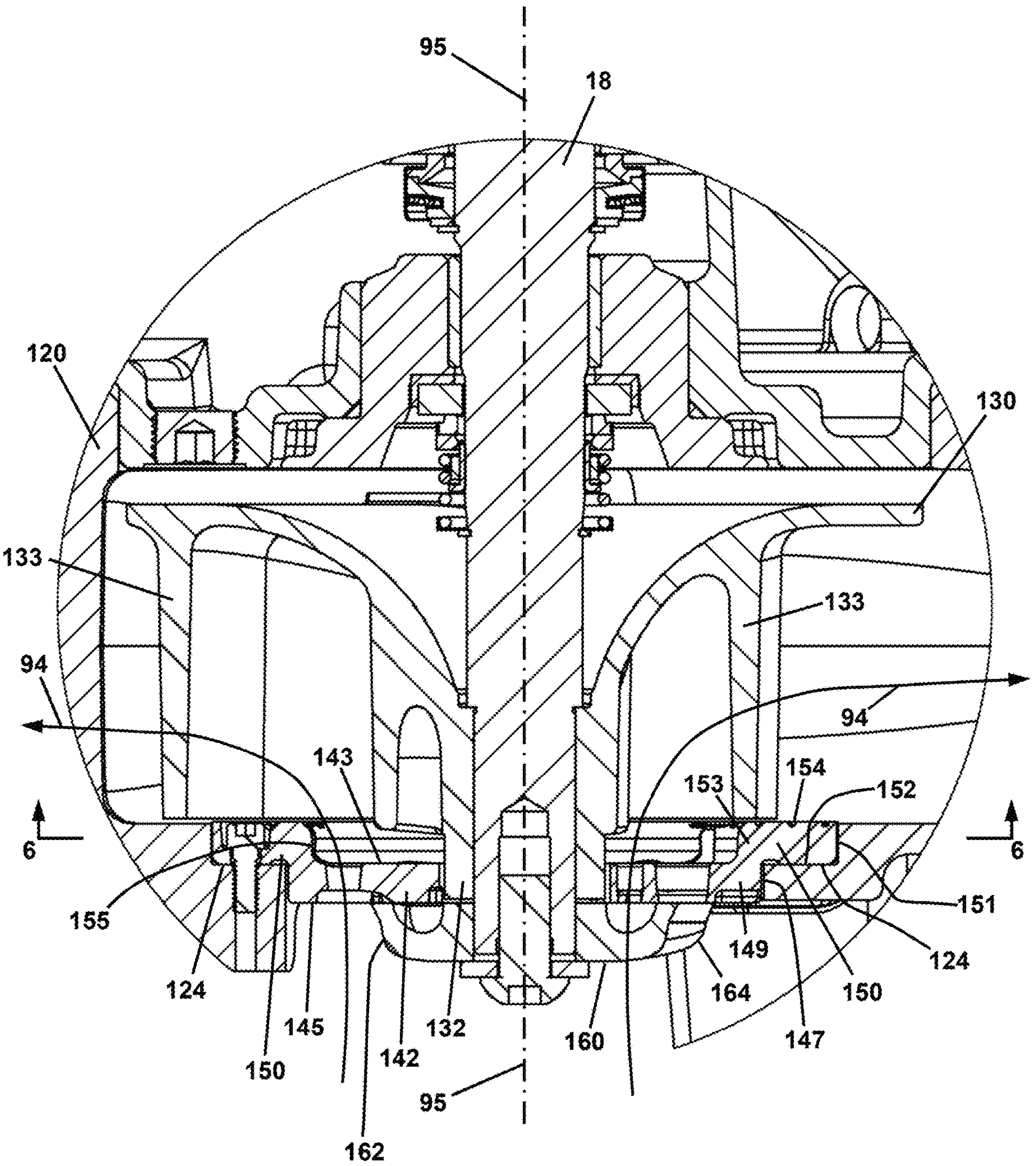
FIG. 2C is a detailed cross-sectional view of the impeller and cutting assembly of the grinder pump of FIGS. 2A and 2B.

An exemplary grinder pump of the present disclosure is provided with a cutter plate, and with an impeller, which are both configured to provide greater flow output at a given power input from the pump motor as compared to a conventional grinder pump. Referring now to FIGS. 2A and 2B, such a grinder pump 100 is comprised of a motor housing 112 containing motor 114, volute housing 120, an impeller 130, and a cutting assembly including a cutter plate 140 and a cutter 160.

Referring also to FIGS. 2C-5, the cutter plate 140 is comprised of a mounting flange 150 and a cutting disc 142. The volute housing 120 has a mounting shoulder 124 that is joined to the mounting flange 150 of the cutter plate. The mounting flange 150 includes a mounting surface 152 joined to the mounting shoulder 124 of the volute housing 120. The mounting flange 150 is comprised of an outer side wall 151, an inner region 153, and an inner side wall 155. The cutting disc 142 is bounded by an inner surface 143, an outer surface 145, and a lateral side wall 147, and includes an outer region 149 contiguous with the inner region 153 of the mounting flange 150. The inner surface 143 of the cutting disc 142 and the inner side wall 155 of the mounting flange 150 form a cylindrical recess 96 in the cutter plate 140.

The impeller 130 of the grinder pump 100 is contained in the volute housing 120 and includes a central hub 132 joined to a drive shaft 18, and a plurality of vanes 133 extending radially outwardly from the central hub 132. The impeller vanes 133 may extend axially to the point where they contact a shearing surface 154 of the flange 150 of the cutter plate 140, albeit with substantially no axial force that results in friction and wear of the two parts. The impeller vanes 133 may be separated from the shearing surface 154 of the flange 150 by a running clearance. In such cases, the impeller vanes 133 may extend axially to within 0.005 to 0.060 inches of the shearing surface 154 of the flange 150.

As the pump impeller 130 rotates, the bottom edges 135 of the spiral-shaped impeller vanes 133 advance along the shearing surface 154 of the mounting flange 150 as indicated by arrow 93 (FIG. 5), resulting in the shearing and further size reduction of solid particles in the slurry that is being pumped. As compared to an impeller 30 of a conventional grinder pump 10, an impeller 130 of a pump 100 of the present disclosure may have impeller vanes 133 that are higher relative to impeller diameter. In the exemplary impeller 130 depicted in FIGS. 4A-4C, the ratio of the impeller diameter to impeller vane height is about 2.7:1.

The grinder pump 100 may be further comprised of a rotary cutter 160 joined to the drive shaft 18 and including at least a first cutting blade 162 and a second cutting blade 164. Each of the first and second cutting blades 162 and 164 may define a cutting plane perpendicular to an axis of rotation 95 of the drive shaft 18 and parallel to the outer surface 145 of the cutting disc 142. The cutting disc 142 may include a plurality of pairs of radially inwardly located through holes 146 and radially outwardly located through holes 148 extending from the inner surface 143 of the cutting disc 142 to the outer surface 145 of the cutting disc 142. The radially outwardly located through holes 148 may have diameters greater than the radially inwardly located through holes 146. In operation of the grinder pump 110, the rotating impeller 130 draws a slurry of the liquid and small particles through the holes 146 and 148 in the cutting disc 142. The slurry is further macerated by the shearing action of the impeller vanes 133 along the shearing surface 154 of the flange 150, and is discharged out through a discharge port 122 in the volute housing, as indicated by arrow 94.

A grinder pump of the present disclosure as set forth above provides greater grinding capability and flow output, as compared to a conventional grinder pump. The conventional grinder pump as referred to herein was originally developed and marketed as a niche product for residences in waterfront communities when the U.S. Environmental Protection Agency issued rules aimed at ceasing operation of inadequate septic systems, which were polluting lakes, rivers, etc. The conventional grinder pump became an alternative to gravity driven septic systems, being capable of reducing particulate size, allowing for smaller diameter pipe, and high heads capable of transporting long distances and elevation. Such systems were particularly suitable for residences that were located below public sewer lines, thus requiring the sewage to be pumped uphill to the sewer line.

For decades, the conventional grinder pump served this application; i.e., as a submersible pump designed to reduce particulate size while having a low cost of installation, often done in challenging terrain. These pumps were designed with two pole motors operating at 3600 RPM and required impellers with short vanes and larger diameters in order to produce the high heads required for the niche application. To maximize the efficiency of the impeller vanes, the eye of the impeller in a conventional grinder pump is smaller relative to the cutting area of the pump, which enables maximum acceleration of the fluid within the pump volute. However, these impeller specifications constrain conventional grinder pumps to relatively low flow outputs.

Around the year 2000, the composition of typical sewage started to change; more and more fibrous materials (e.g., disposable diapers, feminine hygiene products, etc.) were introduced in the sewage stream. Such material would intertwine and jam conventional two vane pumps. While the conventional grinder pump is able to grind and pump such sewage streams, it is limited to certain applications because of its relatively low flow capacity.

Figure 1F:
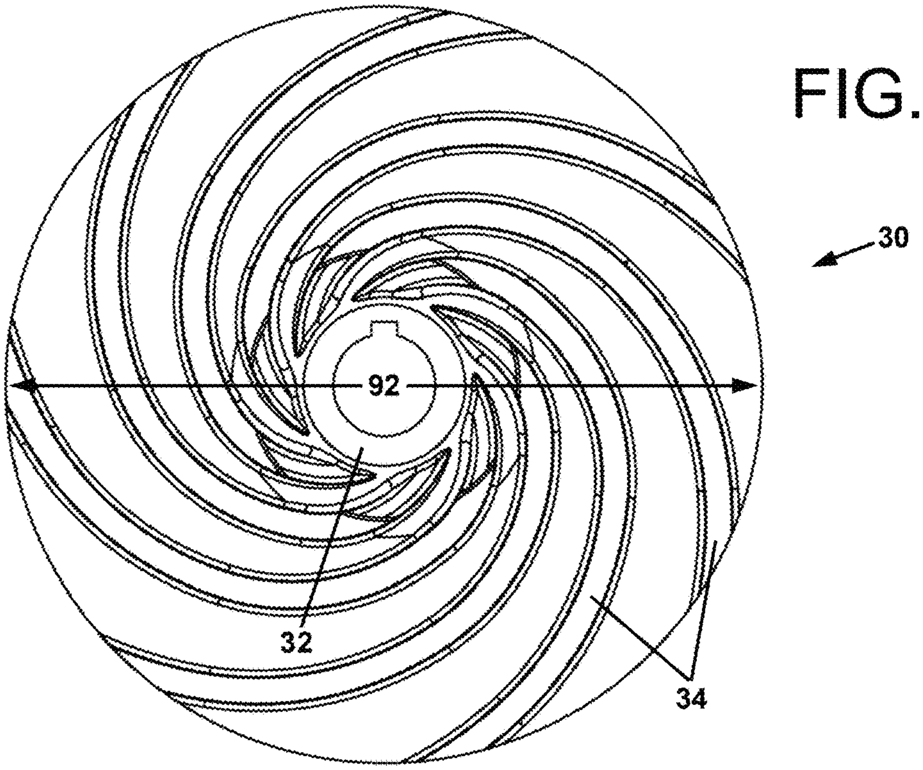
FIG. 1F PRIOR ART
Figure 1G:
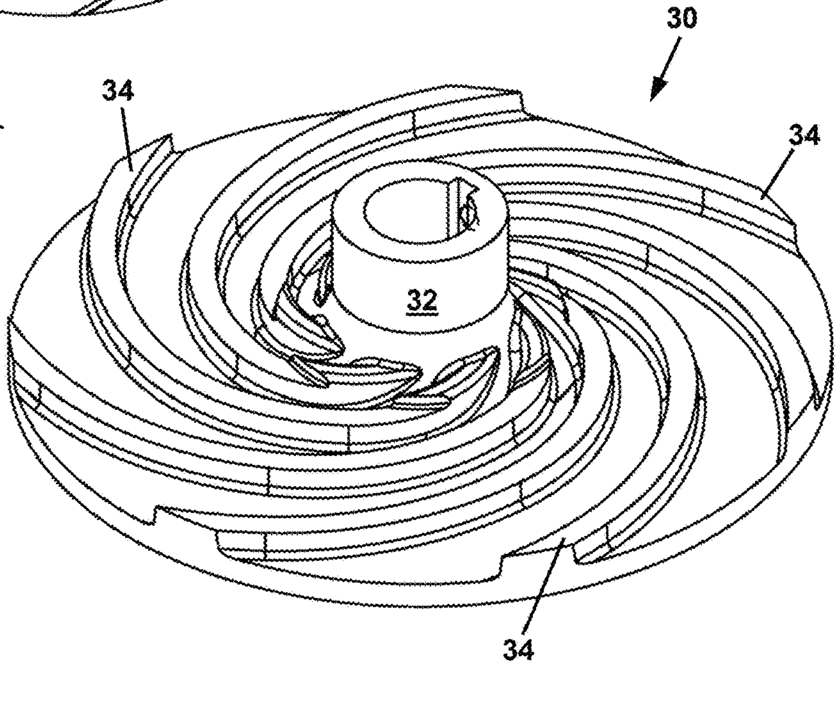
Figure 1H:
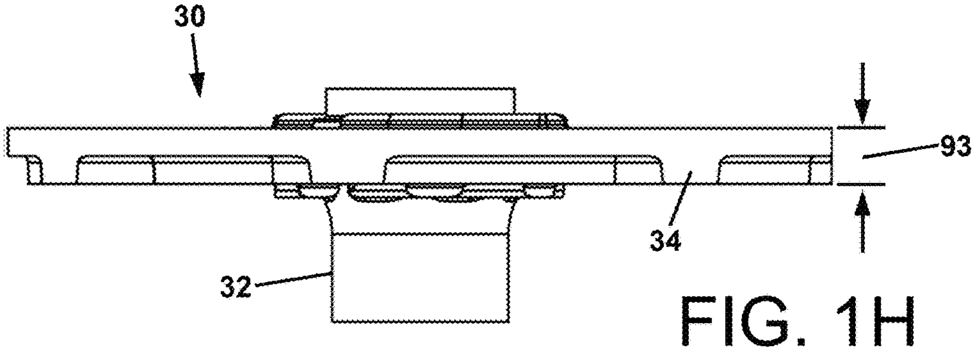
Figure 1I:
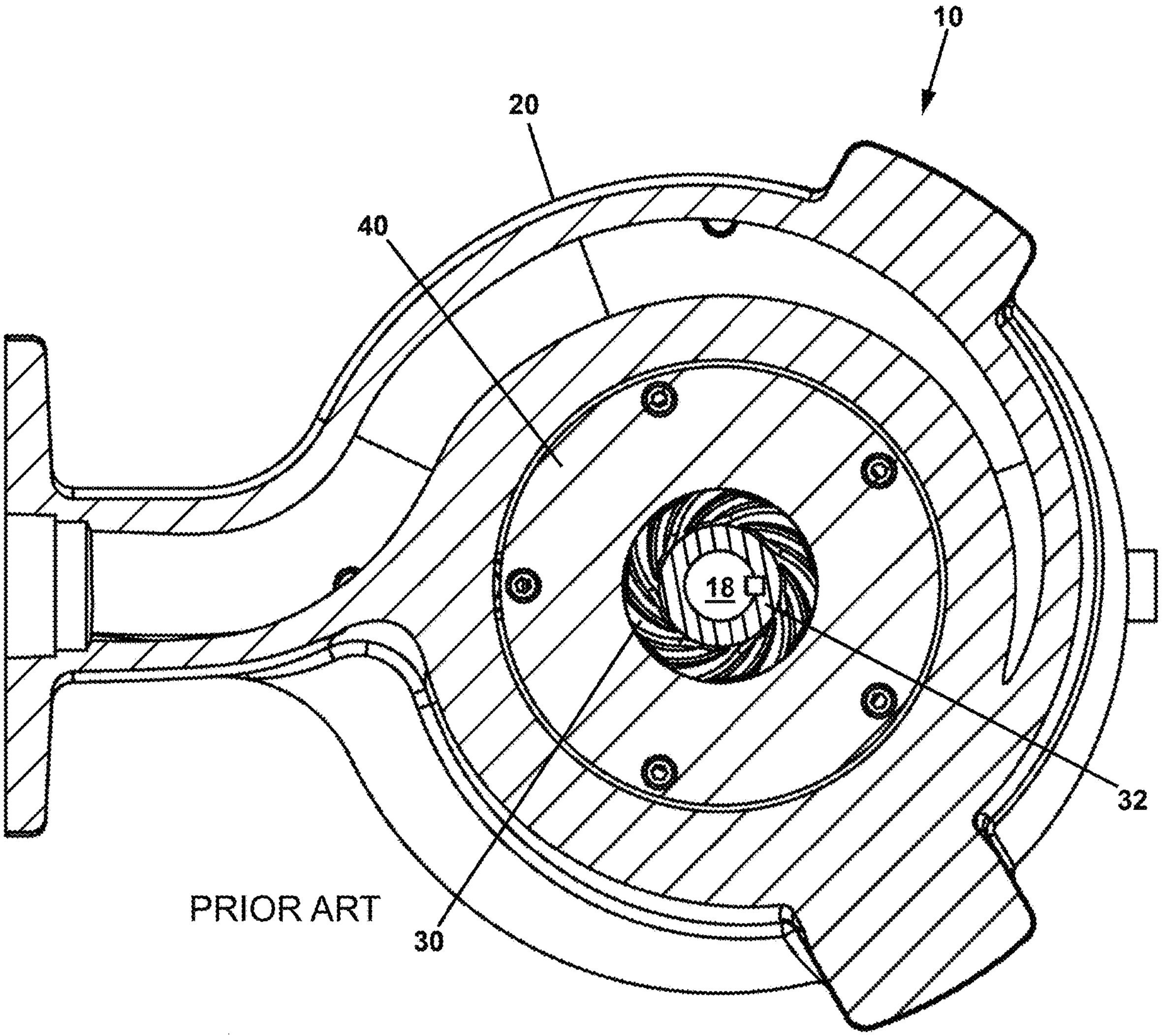

Referring again to FIGS. 1B and 1I, there is a disadvantage in providing a conventional grinder pump having the configuration of the cutter plate 40 and a mounting flange 50. The inner portion 56 results in a relatively narrow annular passageway 97 out of the annular cavity 98 and to the vanes 34 of the impeller. This narrow annular passageway 97 between the hub 31 of the impeller 30 and the cutter plate 40 acts as a flow restriction, and limits the flow output capacity of the pump 10. A "high head" impeller is needed for the most effective pumping through the flow restriction. An example of such an impeller is shown in FIGS. 1F-1H. The impeller 30 has seven vanes, and as noted previously, a ratio of impeller diameter to impeller vane height of about 30:1.

In contrast, the cutter plate 140 and the hub 132 of the impeller 130 of the pump 100 of the present disclosure are configured to provide a large and non-restrictive annular opening from the inner surface 143 of the cutter plate 140 to the vanes 133 of the impeller 130. Such a configuration enables the impeller to transmit more energy into the liquid as it passes to the outer perimeter of the impeller and reaches its final exit velocity within the volute housing 120.

In some cases, the impeller 130 of pump 100 may be configured with fewer vanes than the conventional grinder pump of FIGS. 1A-11. In some cases, the impeller may have a ratio of impeller diameter to impeller vane height of between 1.6 and 11.5. In some cases, the impeller may have a ratio of impeller diameter to impeller vane height of between 2.0 and 5.0.

Figure 4A:
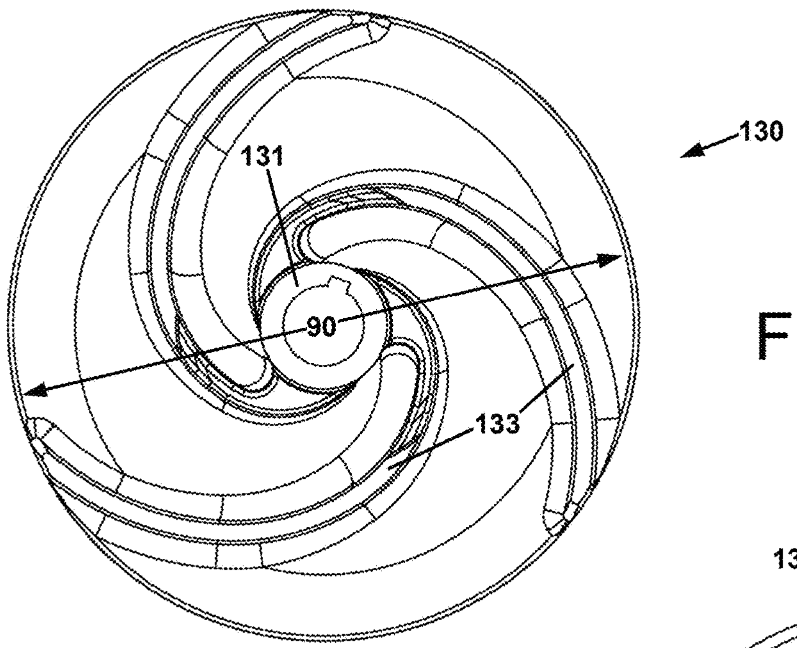
FIGS. 4A, 4B, and 4C are bottom, perspective, and side cross-sectional views of an impeller of the pump of FIGS. 2A and 2B.
Figure 4B:
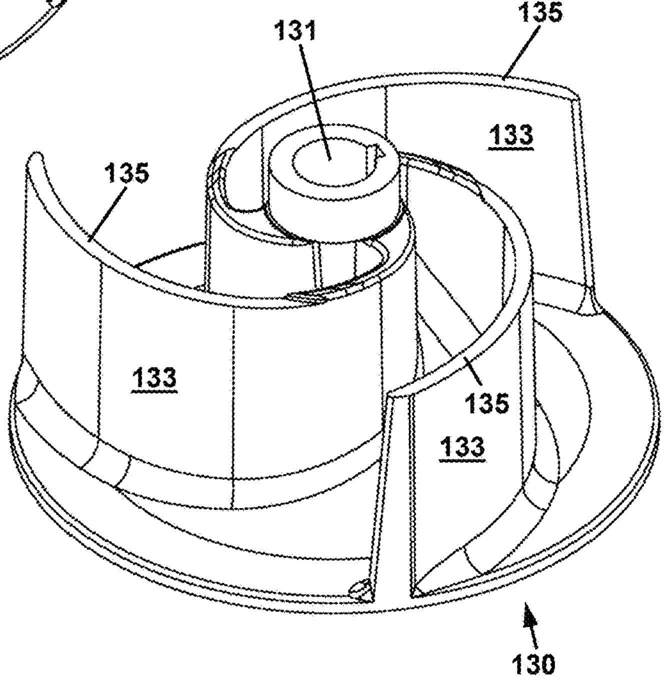
Figure 4C:
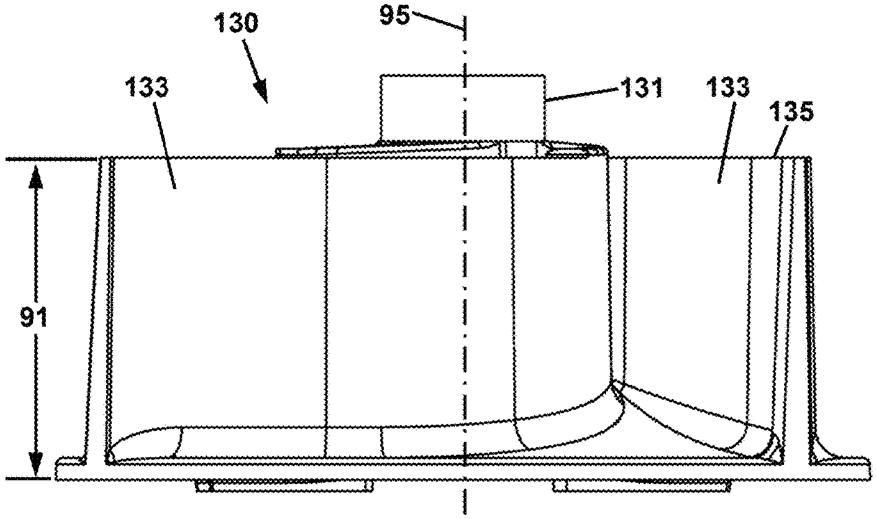
Figure 5:
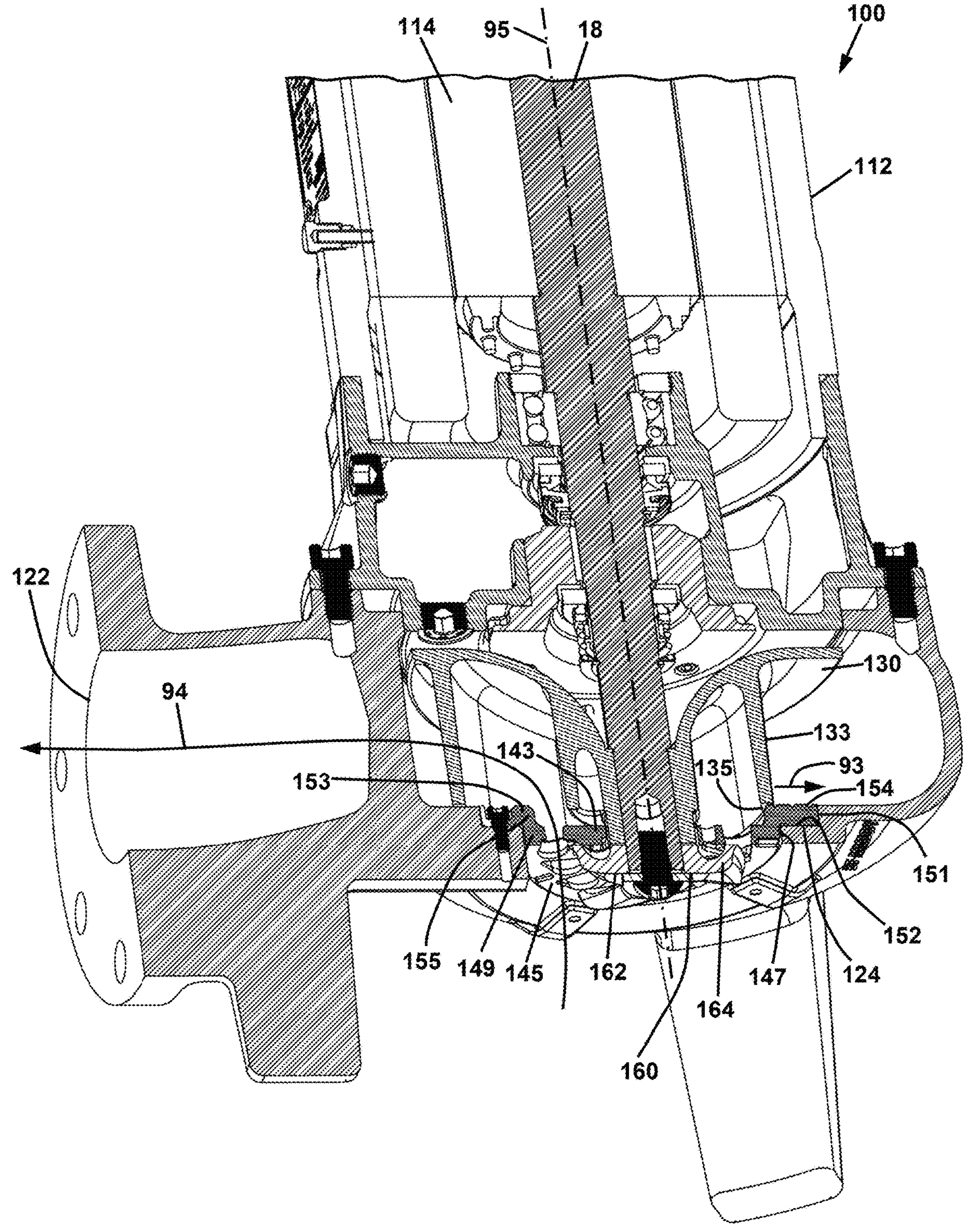
FIG. 5 is a lower perspective view of a cross-section of the pump of FIGS. 2A and 2B.
Figure 6:
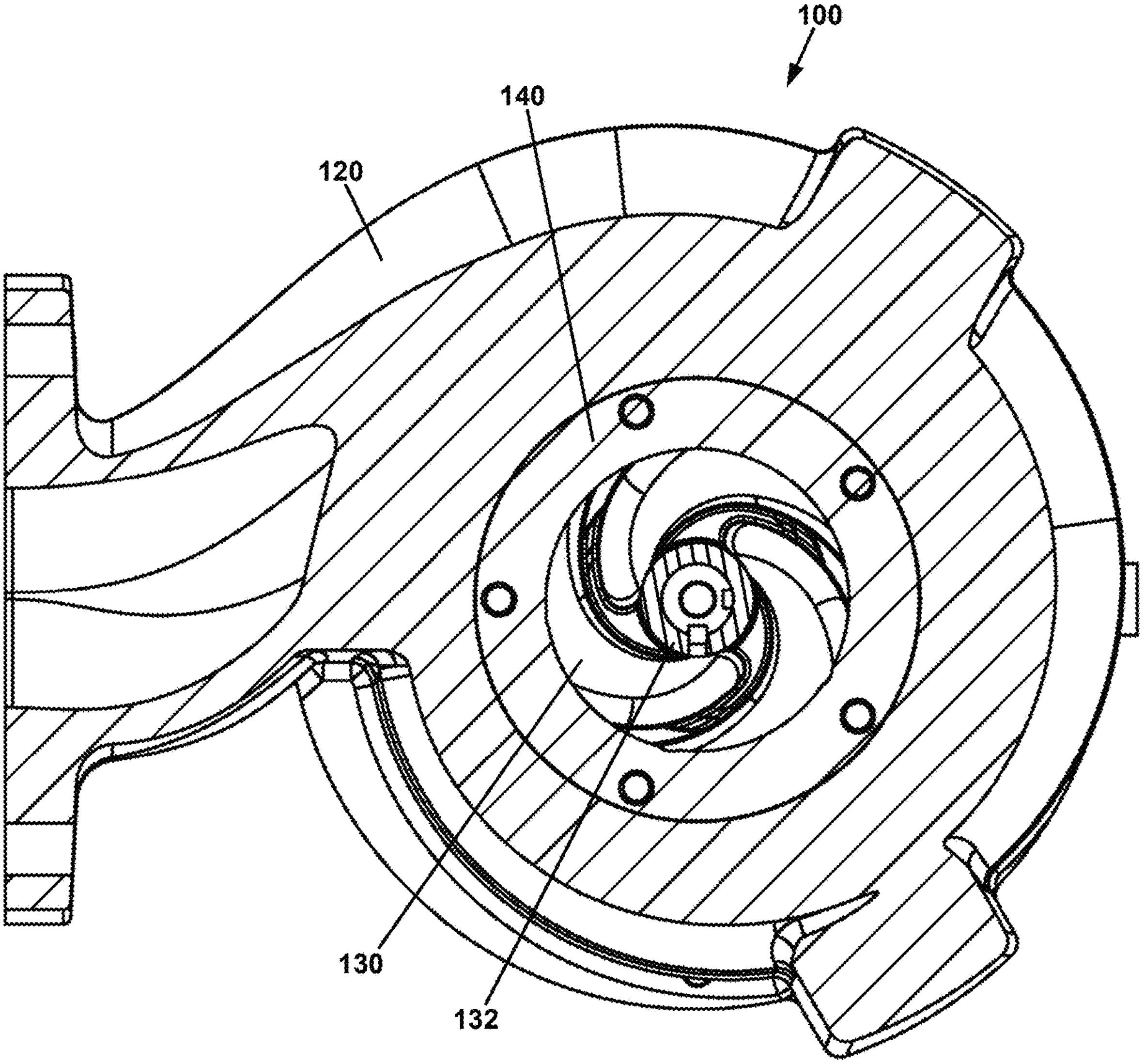
FIG. 6 is an axial upward cross section of the pump of FIG. 2B taken along line 6-6 of FIG. 2C.

In the exemplary impeller 130 of FIGS. 4A-4C, the impeller 130 has a ratio of impeller diameter to impeller vane height of about 2.7:1, as noted previously.

Figure 7A:
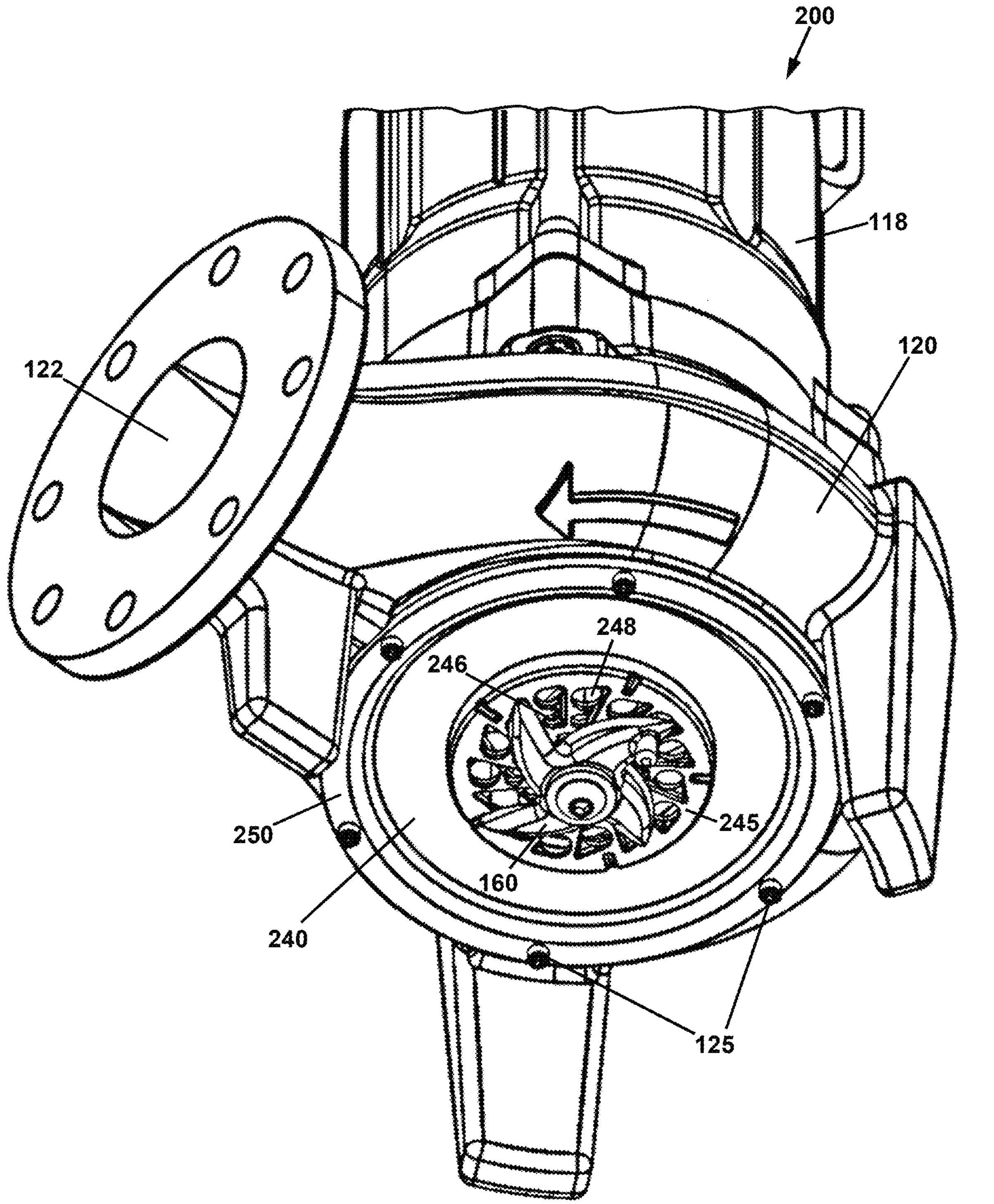
FIG. 7A is a lower perspective view of an alternative grinder pump of the present disclosure.
Figure 7B:
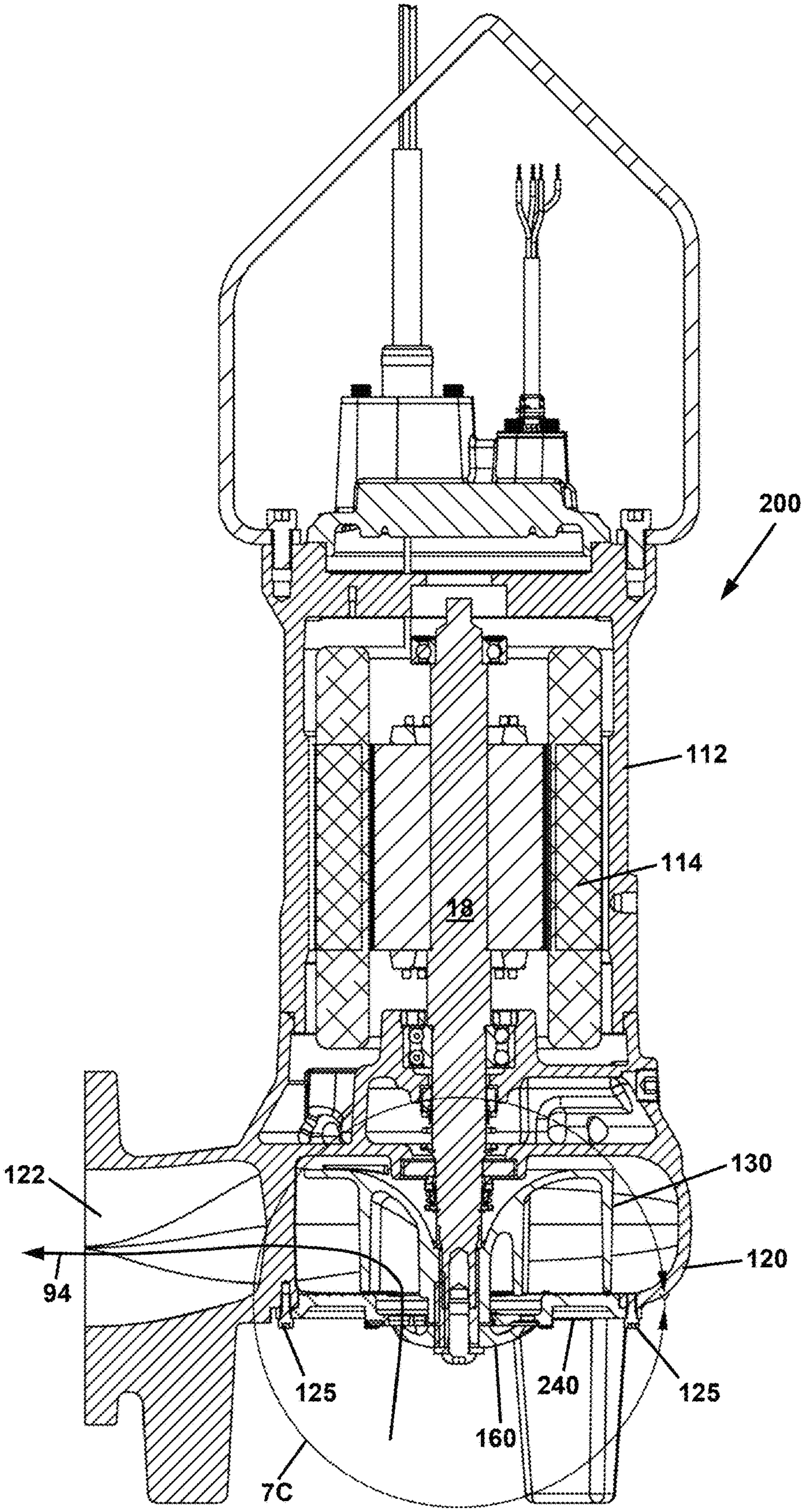
FIG. 7B is a side cross-sectional view of the grinder pump of FIG. 7A.
Figure 7C:
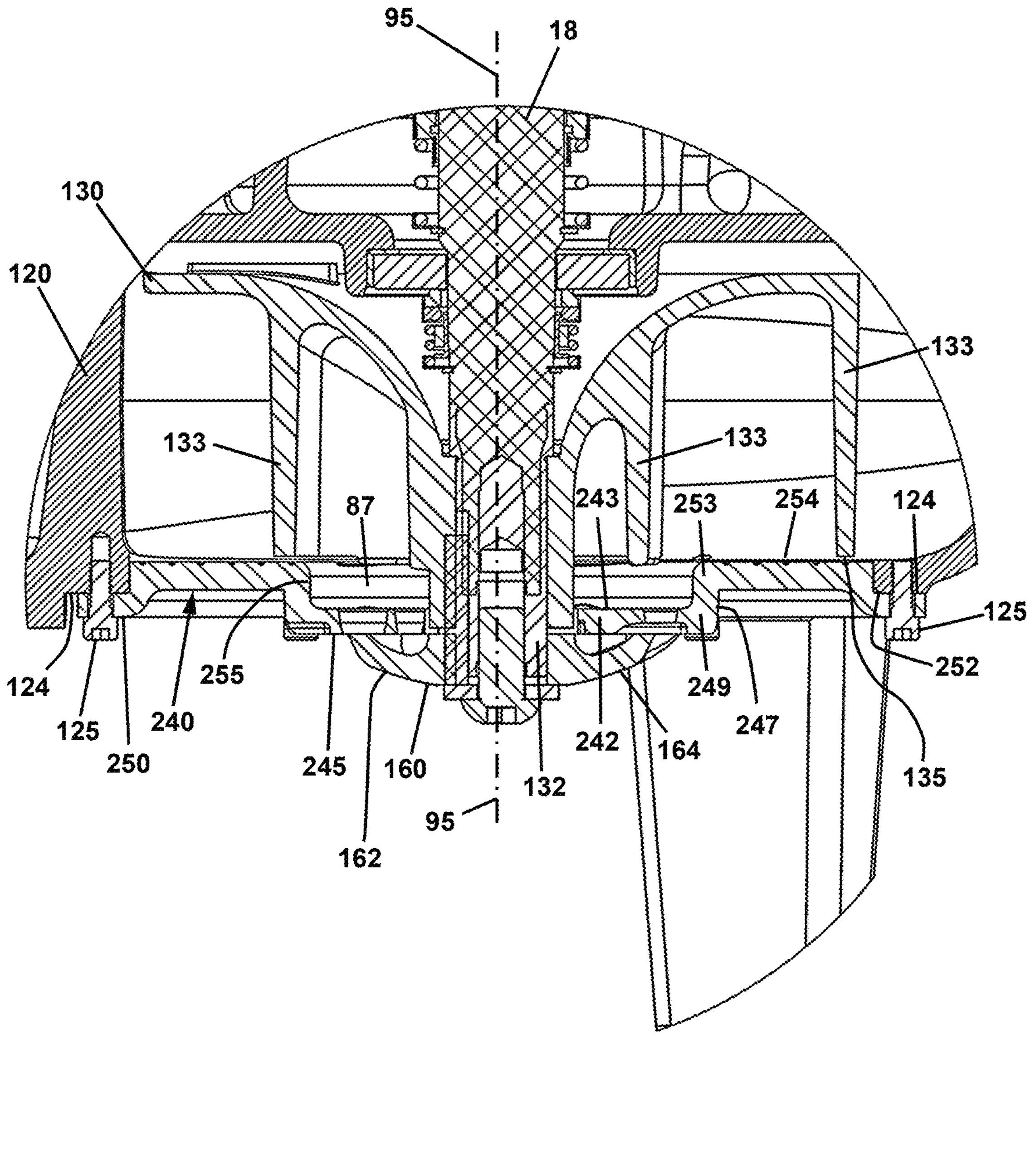
FIG. 7C is a detailed cross-sectional view of the impeller and cutting assembly of the grinder pump of FIGS. 7A and 7B.

FIGS. 7A-7C are views of an alternative grinder pump 200 of the present disclosure. Referring to FIGS. 7A-7C, grinder pump 200 is comprised of a motor housing 112 containing motor 114, volute housing 120, an impeller 130, and a cutting assembly including a cutter plate 240 and a cutter 160.

The cutter plate 240 is comprised of an inner region 253, an inner side wall 255, and a cutting disc 242. The cutter plate 240 may be further comprised of a mounting flange 250 including a mounting surface 252, which may be joined to a mounting shoulder 124 of the volute housing 120 by suitable fasteners such as screws 125. The cutting disc 242 is bounded by an inner surface 243, an outer surface 245, and a lateral side wall 247, and includes an outer region 249 contiguous with the inner region 253 of the cutter plate 240. The inner surface 243 of the cutting disc 242 and the inner side wall 255 of the cutter plate 240 form a cylindrical recess 87 in the cutter plate 240.

The impeller 130 of the grinder pump 200 is contained in the volute housing 120 and includes a central hub 132 joined to a drive shaft 18, and a plurality of vanes 133 extending radially outwardly from the central hub 132. The impeller vanes 133 may extend axially to the point where they contact a shearing surface 254 of the cutter plate 240, in the same manner as described previously for the grinder pump 100 of FIGS. 2A-5.

As the pump impeller 130 rotates, the bottom edges 135 of the spiral-shaped impeller vanes 133 advance along the shearing surface 254 of the cutter plate 240, resulting in the shearing and further size reduction of solid particles in the slurry that is being pumped, as described previously for the grinder pump 100 of FIGS. 2A-5. The impeller 130 of the pump 200 may have impeller vanes 133 that are higher relative to impeller diameter as described previously for the grinder pump 100 of FIGS. 2A-5.

Figure 3A:
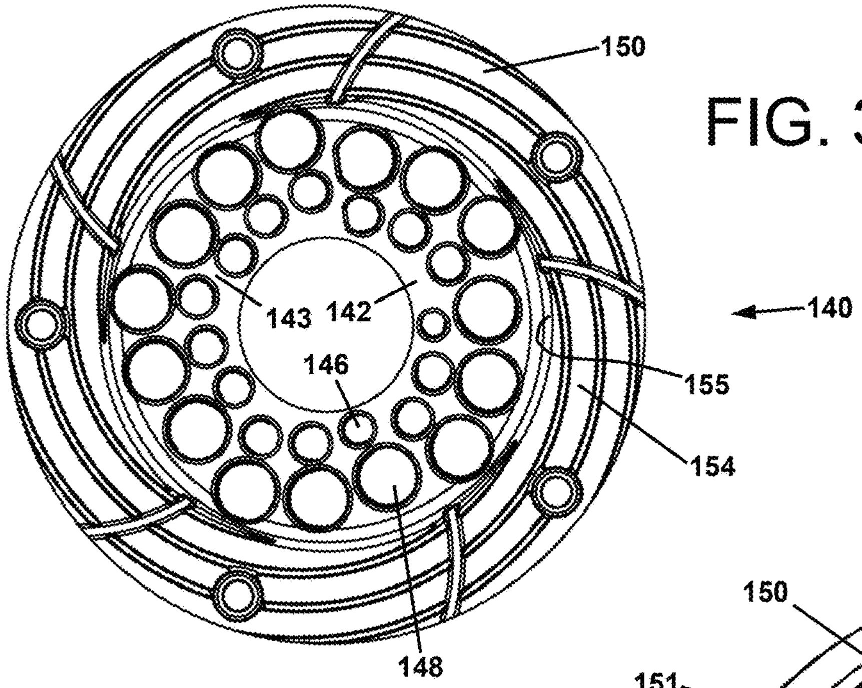
FIGS. 3A, 3B, and 3C are bottom, perspective, and side cross-sectional views of a cutter plate of the pump of FIGS. 2A and 2B.
Figure 3B:
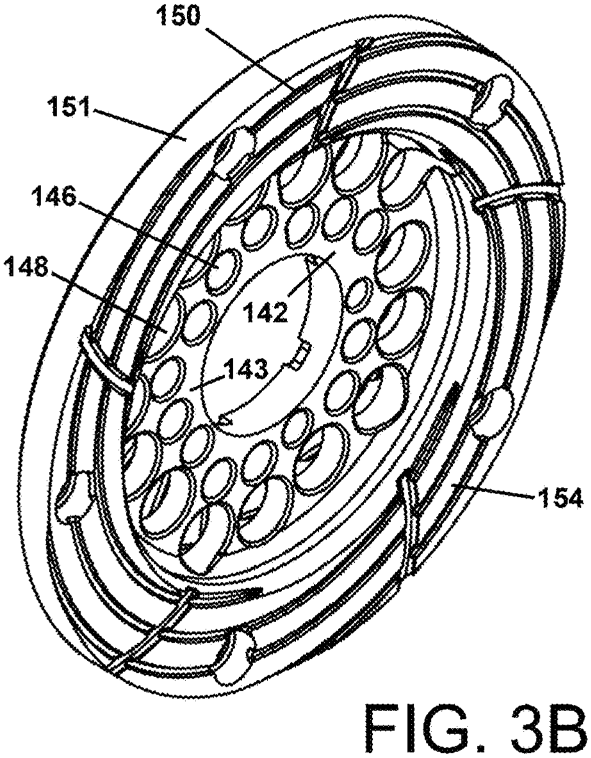
Figure 3C:
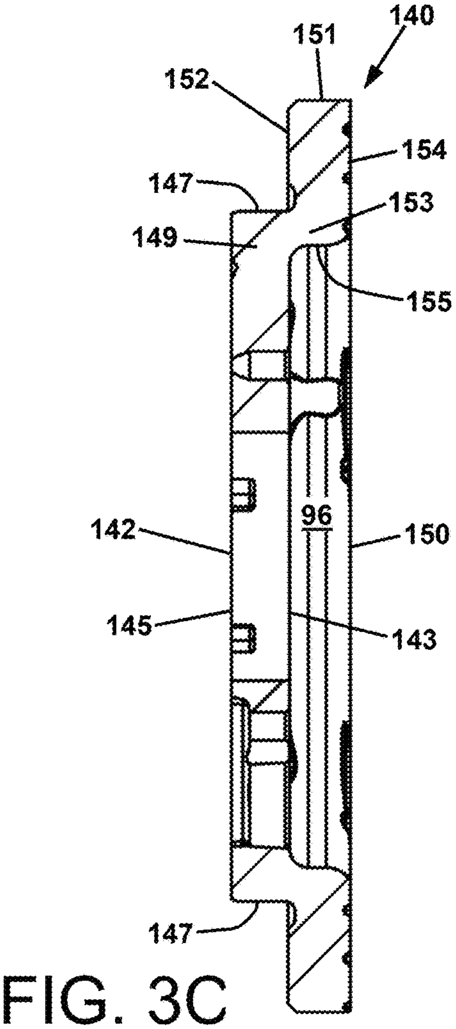

The grinder pump 200 may be further comprised of a rotary cutter 160 joined to the drive shaft 18 and including at least a first cutting blade 162 and a second cutting blade 164. Each of the first and second cutting blades 162 and 164 may define a cutting plane perpendicular to an axis of rotation 95 of the drive shaft 18 and parallel to the outer surface 245 of the cutting disc 242. The cutting disc 242 may include a plurality of pairs of radially inwardly located through holes 246 and radially outwardly located through holes 248 extending from the inner surface 243 of the cutting disc 242 to the outer surface 245 of the cutting disc 242, as also shown in FIGS. 3A-3C for the cutting disc 140 of the pump 100 previously described herein. The radially outwardly located through holes 248 may have diameters greater than the radially inwardly located through holes 246. In operation of the grinder pump 110, the rotating impeller 130 draws a slurry of the liquid and small particles through the holes in the cutting disc 242. The slurry is further macerated by the shearing action of the impeller vanes 133 along the shearing surface 254 of the cutter plate 240, and is discharged out through a discharge port 122 in the volute housing, as indicated by arrow 94.

In some cases (not shown), the grinder pump 100 of FIGS. 2A-6 or the grinder pump of FIGS. 7A-7C may be provided with a cutter plate 140 or 240 that does not include the respective recess 96 or 87. Instead, with regard to the grinder pump 100, the shearing surface 154 and the inner surface 143 of the cutting disc 142 of the cutter plate 140 may be coplanar with each other. In the operation of the pump 100, the bottom edges 135 of the impeller vanes 133 move along the inner surface 143 of the cutting disc 142 and the shearing surface 154 of the mounting flange 150. The impeller vanes may be separated from the shearing surface 154 of the cutter plate 140 and may be separated from the inner surface 143 of the cutting disc 142 by a running clearance as described previously. In like manner. in the operation of the pump 200, the bottom edges 135 of the impeller vanes 133 move along the inner surface 243 of the cutting disc 242 and the shearing surface 254 of the cutter plate 240.

It is further noted that most conventional grinder pumps (in the U.S. and Canada) are designed to operate at 3600 RPM using two pole electric motors that operate on common 60 Hz AC voltages, such as 240 or 600 volts. In contrast, the unique configuration of the cutter, cutter plate, volute intake, and impeller of the grinder pumps of the present disclosure enables them to operate at 1800 RPM using four pole electric motors that operate on the common AC voltages. This is advantageous because a four-pole electric motor has increased torque at a given RPM. Although this enables the motor to be loaded more heavily, its speed limit is 1800 RPM at common 60 Hz AC voltages. When a four-pole motor is used in a conventional grinder pump, a large diameter impeller, such as impeller 30 of FIGS. 1F-1H is required in order to compensate for the 1800 RPM speed limitation (as compared to the limit of 3600 RPM of a 2-pole motor). For such a conventional grinder pump, the relative cost of the pump increases because the larger volute and impeller that are required.

Figure 8:
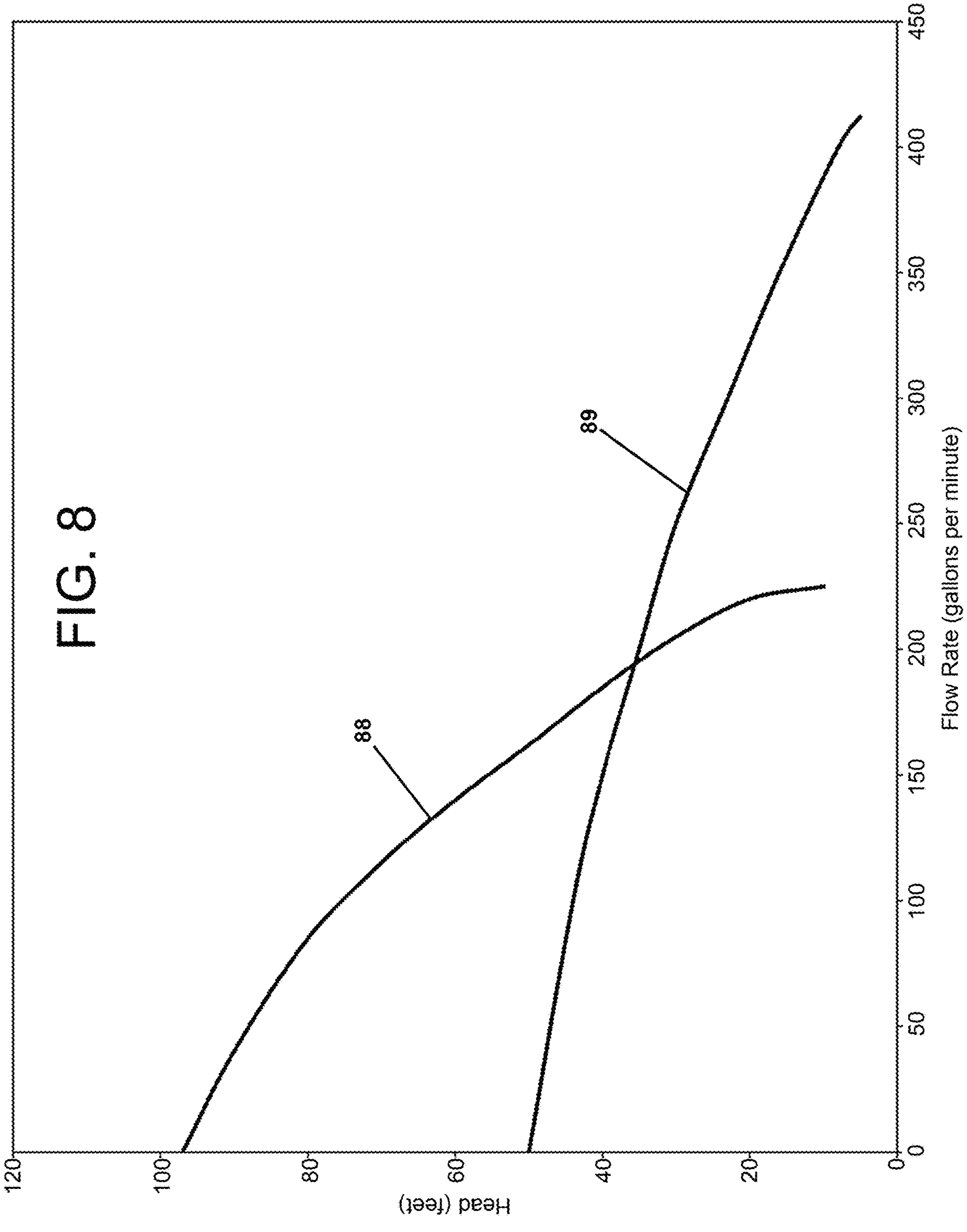
FIG. 8 is a graph of a flow output of a grinder pump of the present disclosure and a flow output of a conventional grinder pump.

In broad terms, the grinder pumps of the present disclosure are "high flow" grinder pumps. FIG. 8 is a graph of a flow output curve 89 of an exemplary grinder pump 100 of the present disclosure and a flow output curve 88 of a conventional grinder pump at the above-specified RPMs. It can be seen that while the maximum possible head of the grinder pump 100 is less than that of the conventional grinder pump, grinder pump 100 provides greater output at heads of less than about 35 feet while operating at half the impeller RPM. A single grinder pump 100 is thus suitable for certain applications not satisfied by a conventional grinder pump, such as e.g., a multi-residence dwelling having multiple sewage output branches.

It is therefore apparent that there has been provided, in accordance with the present disclosure, a grinding impeller and cutting assembly for a grinder pump, and grinder pumps that include these components.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

I claim:

1. A grinder pump comprising a drive shaft rotatable around an axis of rotation, a volute housing including a mounting shoulder, and a cutting assembly including a cutter plate comprised of:

a) a mounting flange joined to the mounting shoulder of the volute housing, and comprising an outer side wall, an inner region, a cylindrical inner side wall, and a shearing surface between the outer side wall and the inner side wall; and b) a cutting disc bounded by an inner surface, an outer surface, and a lateral side wall, and including an outer region contiguous with the inner region of the mounting flange, the inner surface of the cutting disc and the inner side wall of the mounting flange forming a cylindrical recess in the cutter plate, the cylindrical recess extending from the inner surface of the cutting disc to the shearing surface of the mounting flange.

2. The grinder pump of claim 1, further comprising an impeller including a plurality of impeller vanes extending axially to the shearing surface of the cutter plate.

3. The grinder pump of claim 2, wherein the impeller vanes are separated from the shearing surface of the cutter plate by a running clearance.

4. The grinder pump of claim 2, wherein the impeller vanes extend axially to within 0.005" to 0.060" inches of the shearing surface of the cutter plate.

5. The grinder pump of claim 1, further comprising a rotary cutter joined to the drive shaft and comprising at least a first cutting blade and a second cutting blade, each of the first and second cutting blades defining a cutting plane perpendicular to the drive shaft axis of rotation and parallel to the outer surface of the cutting disc.

6. The grinder pump of claim 1, wherein the cutting disc include a plurality of pairs of radially inwardly located through holes and radially outwardly located through holes extending from the inner surface of the cutting disc to the outer surface of the cutting disc, the radially outwardly located through holes having diameters greater than the radially inwardly located through holes.

7. The grinder pump of claim 1, further comprising an impeller having a ratio of impeller diameter to impeller height between 1.6 and 11.5.

8. The grinder pump of claim 1, further comprising an impeller having a ratio of impeller diameter to impeller vane height between 2.0 and 5.0.

9. A cutting assembly comprising:

a) a cutter plate comprised of:

a mounting flange including an outer side wall, an inner region, a cylindrical inner side wall, and a shearing surface between the outer side wall and the inner side wall; and a cutting disc bounded by an inner surface, an outer surface, and a lateral side wall, and including an outer region contiguous with the inner region of the mounting flange, wherein the inner surface of the cutting disc and the inner side wall of the mounting flange form a cylindrical recess in the cutter plate, the cylindrical recess extending from the inner surface of the cutting disc to the shearing surface of the mounting flange; and b) a rotary cutter having an axis of rotation and comprising at least a first cutting blade and a second cutting blade, each of the first and second cutting blades defining a cutting plane perpendicular to the axis of rotation and parallel to the outer surface of the cutting disc.

10. The cutting assembly of claim 9, wherein the cutting disc include a plurality of pairs of radially inwardly located through holes and radially outwardly located through holes extending from the inner surface of the cutting disc to the outer surface of the cutting disc, the radially outwardly located through holes having diameters greater than the radially inwardly located through holes.

11. A grinder pump comprising a drive shaft rotatable around an axis of rotation, a volute housing, and a cutting assembly including a cutter plate joined to the volute housing and comprised of:

a) an inner region, and a cylindrical inner side wall, and a shearing surface contiguous with the inner side wall; and b) a cutting disc bounded by an inner surface, an outer surface, and a lateral side wall, and including an outer region contiguous with the inner region of the cutter plate, the inner surface of the cutting disc and the inner side wall of the cutter plate forming a cylindrical recess in the cutter plate, the cylindrical recess extending from the inner surface of the cutting disc to the shearing surface of the cutter plate.

12. The grinder pump of claim 11, further comprising an impeller including a plurality of impeller vanes extending axially to the shearing surface of the cutter plate.

13. The grinder pump of claim 12, wherein the impeller vanes are separated from the shearing surface of the cutter plate by a running clearance.

14. The grinder pump of claim 12, wherein the impeller vanes extend axially to within 0.005" to 0.060" inches of the shearing surface of the cutter plate.

15. The grinder pump of claim 11, further comprising a rotary cutter joined to the drive shaft and comprising at least a first cutting blade and a second cutting blade, each of the first and second cutting blades defining a cutting plane perpendicular to the drive shaft axis of rotation and parallel to the outer surface of the cutting disc.

16. The grinder pump of claim 11, wherein the cutting disc include a plurality of pairs of radially inwardly located through holes and radially outwardly located through holes extending from the inner surface of the cutting disc to the outer surface of the cutting disc, the radially outwardly located through holes having diameters greater than the radially inwardly located through holes.

17. The grinder pump of claim 11, further comprising an impeller having a ratio of impeller diameter to impeller height between 1.6 and 11.5.

18. The grinder pump of claim 11, further comprising an impeller having a ratio of impeller diameter to impeller vane height between 2.0 and 5.0.

19. A cutting assembly comprising:

a) a cutter plate comprised of:

an inner region, and a cylindrical inner side wall, and a shearing surface contiguous with the inner side wall; and a cutting disc bounded by an inner surface, an outer surface, and a lateral side wall, and including an outer region contiguous with the inner region of the cutter plate, the inner surface of the cutting disc and the inner side wall of the cutter plate forming a cylindrical recess in the cutter plate, the cylindrical recess extending from the inner surface of the cutting disc to the shearing surface of the cutter plate; and b) a rotary cutter having an axis of rotation and comprising at least a first cutting blade and a second cutting blade, each of the first and second cutting blades defining a cutting plane perpendicular to the axis of rotation and parallel to the outer surface of the cutting disc.

20. The cutting assembly of claim 19, wherein the cutting disc include a plurality of pairs of radially inwardly located through holes and radially outwardly located through holes extending from the inner surface of the cutting disc to the outer surface of the cutting disc, the radially outwardly located through holes having diameters greater than the radially inwardly located through holes.

* * * * *